US012677193B2

(12) United States Patent
Yang et al.

(10) Patent No.: US 12,677,193 B2
(45) Date of Patent: Jul. 7, 2026

(54) NETWORK SLICING CAPACITY PLANNING BASED ON THROUGHPUT VARIATION AND LATENCY VARIATION

(71) Applicant: Verizon Patent and Licensing Inc., Basking Ridge, NJ (US)

(72) Inventors: Jin Yang, Orinda, CA (US); Ravi Potluri, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 346 days.

(21) Appl. No.: 18/512,969

(22) Filed: Nov. 17, 2023

(65) Prior Publication Data

US 2025/0168703 A1     May 22, 2025

(51) Int. Cl.
| | |
|---|---|
| *H04W 28/16* | (2009.01) |
| *H04L 43/0888* | (2022.01) |
| *H04W 24/02* | (2009.01) |
| *H04W 28/02* | (2009.01) |

(52) U.S. Cl.
CPC ......... *H04W 28/16* (2013.01); *H04L 43/0888* (2013.01); *H04W 24/02* (2013.01); *H04W 28/0236* (2013.01)

(58) Field of Classification Search
None
See application file for complete search history.

(56) References Cited

U.S. PATENT DOCUMENTS

| | | | | |
|---|---|---|---|---|
| 10,129,894 B2 * | 11/2018 | Farmanbar | ........ | H04W 28/0247 |
| 11,134,487 B2 * | 9/2021 | Samdanis | ................. | H04L 5/14 |
| 11,159,408 B2 * | 10/2021 | Svennebring | ......... | H04L 41/147 |
| 11,240,855 B2 * | 2/2022 | Babbellapati | ......... | H04W 48/12 |
| 11,646,492 B2 * | 5/2023 | Tran | ...................... | G06N 3/096 |
| | | | | 343/721 |
| 11,653,289 B2 * | 5/2023 | Zhu | ........................ | H04M 15/66 |
| | | | | 370/229 |
| 11,778,501 B2 * | 10/2023 | Jeong | ...................... | H04W 4/24 |
| | | | | 370/230 |
| 11,950,280 B2 * | 4/2024 | Iyer | .......................... | H04L 5/001 |
| 12,035,387 B2 * | 7/2024 | Schmitz | ................ | H04L 67/306 |
| 12,050,137 B2 * | 7/2024 | Zinger | ................ | H04L 12/2829 |
| 12,177,133 B2 * | 12/2024 | Morrison | ................. | G06N 3/09 |
| 12,250,258 B2 * | 3/2025 | Sun | .................... | H04W 28/0925 |
| 12,273,274 B2 * | 4/2025 | Thyagaturu | ............. | H04L 41/40 |
| 12,299,113 B2 * | 5/2025 | Metsch | ............... | H04L 63/1433 |
| 12,328,253 B2 * | 6/2025 | Filsfils | ............... | H04L 47/6295 |

(Continued)

FOREIGN PATENT DOCUMENTS

| | | | | | |
|---|---|---|---|---|---|
| EP | | 3820091 B1 * | 4/2023 | ........ | H04W 28/0284 |
| EP | | 4429323 A1 * | 9/2024 | ............ | H04W 28/20 |

(Continued)

*Primary Examiner* — Melvin H Pollack

(57)     ABSTRACT

A network device determines at least one of throughput variation and latency variation associated with at least one flow transiting a network slice of a mobile network. The network device compares the at least one of the throughput variation and the latency variation with performance requirements of the network slice, and determines, based on the comparing, network slice resources needed for capacity planning of the network slice. The network device adds or removes network slice resources from the network slice based on the determined network slice resources.

20 Claims, 6 Drawing Sheets

(56) References Cited

U.S. PATENT DOCUMENTS

| | | | | |
|---|---|---|---|---|
| 12,368,681 | B2 * | 7/2025 | Sharma Banjade | .......................... H04W 12/122 |
| 12,389,273 | B2 * | 8/2025 | Yeh | ..................... H04W 28/084 |
| 12,407,434 | B2 * | 9/2025 | Svennebring | ...... H04B 17/3913 |
| 12,418,837 | B2 * | 9/2025 | Wajda | ..................... H04W 24/02 |
| 12,457,550 | B1 * | 10/2025 | Woods | .................. H04W 24/10 |
| 12,489,507 | B2 * | 12/2025 | Ganjalizadeh | ........... G06N 7/01 |
| 12,495,315 | B2 * | 12/2025 | Smith | ................... H04W 24/04 |
| 2022/0239568 | A1 * | 7/2022 | Celozzi | ................. H04L 41/342 |
| 2022/0303331 | A1 * | 9/2022 | Svennebring | .... H04N 21/44209 |
| 2022/0330093 | A1 * | 10/2022 | Rahman | ................. H04L 47/125 |
| 2022/0400401 | A1 * | 12/2022 | Gupta | ..................... H04L 47/70 |
| 2023/0006889 | A1 * | 1/2023 | Thyagaturu | ......... H04L 41/5054 |
| 2023/0020027 | A1 * | 1/2023 | Buyukdura | ........... H04W 28/16 |
| 2023/0403606 | A1 * | 12/2023 | Lunardi | ............... H04W 24/02 |
| 2024/0244484 | A1 * | 7/2024 | Lunardi | ............... H04W 24/10 |
| 2024/0259879 | A1 * | 8/2024 | Ranganath | ............... G06N 5/01 |
| 2024/0259931 | A1 * | 8/2024 | Dhamija | ............. H04L 41/5025 |
| 2024/0386054 | A1 * | 11/2024 | Wouhaybi | ............... H04L 45/16 |
| 2024/0430165 | A1 * | 12/2024 | Bansal | ............... H04L 41/0893 |
| 2025/0016072 | A1 * | 1/2025 | Campo | .............. H04L 41/5025 |
| 2025/0039714 | A1 * | 1/2025 | Lunardi | ............... H04L 41/344 |

FOREIGN PATENT DOCUMENTS

| | | | | | |
|---|---|---|---|---|---|
| EP | 3907933 | B1 * | 11/2024 | ......... | H04L 41/0897 |
| EP | 4482100 | B1 * | 6/2025 | ......... | H04L 41/5048 |
| WO | WO-2023080688 | A1 * | 5/2023 | ......... | H04L 43/0823 |
| WO | WO-2025172157 | A1 * | 8/2025 | ......... | H04L 41/0895 |

* cited by examiner

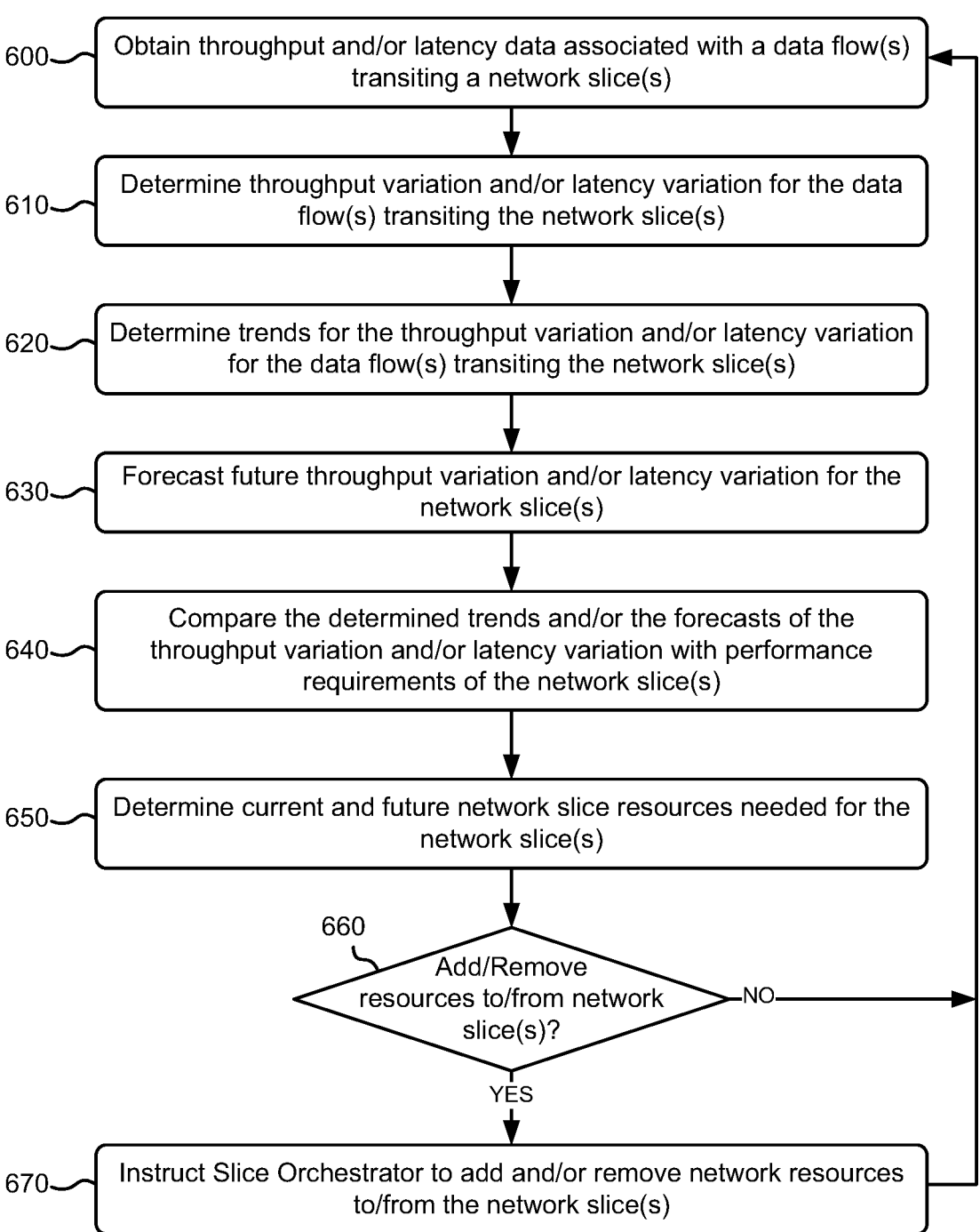

600 — Obtain throughput and/or latency data associated with a data flow(s) transiting a network slice(s)

610 — Determine throughput variation and/or latency variation for the data flow(s) transiting the network slice(s)

620 — Determine trends for the throughput variation and/or latency variation for the data flow(s) transiting the network slice(s)

630 — Forecast future throughput variation and/or latency variation for the network slice(s)

640 — Compare the determined trends and/or the forecasts of the throughput variation and/or latency variation with performance requirements of the network slice(s)

650 — Determine current and future network slice resources needed for the network slice(s)

660 — Add/Remove resources to/from network slice(s)?

NO

YES

670 — Instruct Slice Orchestrator to add and/or remove network resources to/from the network slice(s)

FIG. 6

NETWORK SLICING CAPACITY PLANNING BASED ON THROUGHPUT VARIATION AND LATENCY VARIATION

BACKGROUND

"Network Slicing" is an innovation for implementation in Next Generation Mobile Networks, such as, for example, Fifth Generation (5G) Mobile Networks. Network slicing is a type of virtualized networking architecture that involves partitioning of a single physical network into multiple virtual networks that may be composed of various Virtual Network Functions (VNFs). The partitions, or "slices," of a virtualized network, including each slice's VNFs, may be customized to meet the specific needs of applications, services, devices, customers, and/or operators. Each network slice can have its own architecture, provisioning management, and security that supports data sessions transported over the network slice. Bandwidth, capacity, and connectivity functions are allocated within each network slice to meet the requirements of the objective(s) of the particular network slice. For example, each network slice, when created in a mobile network, may be designed to satisfy one or more performance characteristics or performance requirements for data sessions that are serviced by the network slice. Network slicing may be implemented in a dynamic fashion, such that the slices of the virtualized network may change over time and may be re-customized to meet new or changing needs of applications, services, devices, customers, and/or operators.

BRIEF DESCRIPTION OF THE DRAWINGS

FIG. 6 is a flow diagram of an example process for determining throughput variation and/or latency variation values associated with a data flow transiting a network slice of a mobile network, and using the determined values as a basis for network resource allocation and network slice capacity planning.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

Network slicing is a key benefit of Next Generation wireless network architectures, such as the 5G mobile network architecture. Next Generation mobile networks are expected to support network slices that satisfy one or more performance characteristics for data sessions that are serviced by the network slices. Particular network slices may be built to support a class of applications (e.g., cloud gaming, productivity apps, media streaming, messaging) requiring particular capabilities or performance characteristics (e.g., low latency, high bandwidth).

Latency and reliability have historically been indicators of Quality of Experience (QoE) for a wide range of network services. Data throughput and latency have also been used for network capacity and network slicing planning. Analysis has shown that for some network services, QoE is associated with variations in throughput and latency in the mobile network. For some network services, such as for example, cloud gaming, throughput variation and latency variation are key performance parameters for a high-quality cloud gaming experience. Network slice resource allocation and network slicing capacity planning based on measured throughput variation and latency variation, as described herein, would achieve higher QoE for mobile network users, such as cloud gamers.

Figure 1:
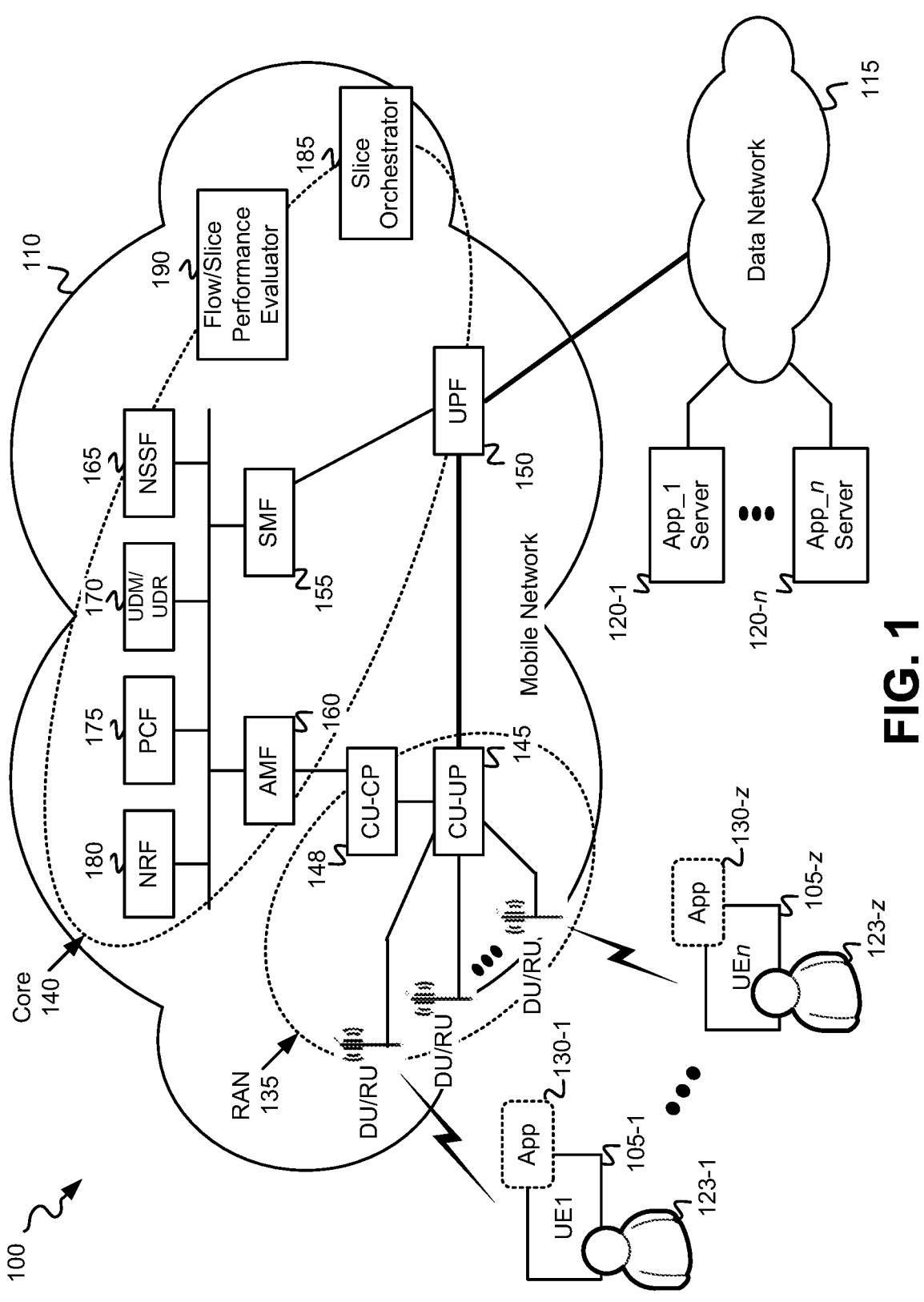
FIG. 1 depicts an example of a network environment in which throughput variation and/or latency variation associated with data flows transiting one or more network slices are used for network slice capacity planning and network slice resource allocation.

FIG. 1 depicts an example of a network environment 100 in which throughput variation and/or latency variation associated with data flows transiting one or more network slices are used for network slice capacity planning and network slice resource allocation. As shown, network environment 100 may include UEs 105-1 through 105-z (generically referred to herein as a "UE 105" or "UEs 105"), a mobile network 110, and a data network(s) 115.

UEs 105-1 through 105-z may each include any type of device having a communication capability, such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a gaming system; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 123-1 is shown in association with UE 105-1 and a user 123-z is shown in association with UE 105-z.

Each UE 105 may have installed, and may execute, at least one application (app) that can be used to establish data sessions with a respective app server (or with another destination node). An app 130-1 is shown executing at UE 105-1, and an app 130-z is shown executing at UE 105-z. In one example, app 130-1 executing at UE 105-1 may connect, and establish a session, with an app server 120-1 in data network 115, and app 130-z executing at UE 105-z may connect, and establish a session, with an app server 120-n in data network 115 Each app 130 may generate data traffic that has particular characteristics and has particular network performance requirements for achieving a desired level of user experience for the user 123 at a respective UE 105. For example, a particular app 130, such as a cloud gaming app, may require a particular maximum throughput variation, a particular maximum latency variation, a high bandwidth, and a certain maximum level of latency, over mobile network 110 to ensure a high QoE for the user 123 at the UE 105. Though FIG. 1 only shows a single app 130 at each UE 105, each UE 105 may be installed with, and may execute, multiple apps 130 whose traffic may transit mobile network 110 via one of multiple different network slices implemented in mobile network 110.

Mobile network 110 may include a Public Land Mobile Network (PLMN) (referred to herein as a "mobile network 110" or a "network 110") and possibly one or more other networks. Mobile network 110 may include one or more sub-networks, such as a Radio Access Network (RAN) 135 and a mobile core network 140 (referred to herein as "core network 140" or "mobile core network 140"). Mobile network 110 may include one or more nodes/functions (e.g., UPF(s) 150) that interconnect with data network 115. Mobile network 110 may, as described with respect to FIG. 2 below, implement multiple different network slices for data flows transiting across mobile network 110, such as from a UE 105 to an app server 120, or from an app server 120 to a UE 105.

RAN 135 may include various types of radio access equipment that implement Radio Frequency (RF) communication with UEs 105. The radio access equipment of RAN 135 may include, for example, multiple Distributed Units (DUs) and Remote Units (RUs), and at least one Control Unit-User Plane function (CU-UP) 145 and at least one Control Unit-Control Plane (CU-CP) function 148. Additionally, or alternatively, RAN 135 may include non-split or integrated RAN devices, such as a Next Generation NodeB (gNB). Only a single one of CU-UP 145 and CU-CP 145 is shown in FIG. 1, however, RAN 135 may include multiple CU-CPs and CU-UPs. Each DU includes a logical node that hosts functions associated with the Radio Link Control (RLC) layer, the Medium Access Control (MAC) layer, and the physical layer (PHY). A RU may be connected to each DU, and each RU may include at least one radio transceiver, and associated antenna(s), for RF wireless communication with one or more UEs 105 within radio range of the RU.

CU-UP 145 may interconnect with one or more DUs of RAN 135 via fronthaul links or a fronthaul network, and may include a logical node that hosts user plane functions, such as, for example, data routing and transport functions. CU-CP 148 includes a logical node that hosts Radio Resource Control (RRC), and other control plane, functions (e.g., Service Data Adaptation Protocol (SDAP), Packet Data Convergence Protocol (PDCP)) for the CU-UP 145. RAN 135 may additionally include other nodes, functions, and/or components not shown in FIG. 1.

Core network 140 includes devices or nodes that implement NFs (e.g., VNFs) that operate the mobile network 110 including, among other NFs, mobile network access management, session management, and policy control NFs. In the example network environment 100 of FIG. 1, core network 140 is shown as including a 5G mobile network that further includes 5G Network Functions (NFs), such as a User Plane Function (UPF) 150, a Session Management Function (SMF) 155, an Access and Mobility Management Function (AMF) 160, a Network Slice Selection Function (NSSF) 165, a Unified Data Management/User Data Repository (UDM/UDR) function 170, a Policy Control Function (PCF) 175, a Network Repository Function (NRF) 180, a slice orchestrator 185, and a flow/slice performance evaluator 190. UPF 150, SMF 155, AMF 160, NSSF 165, UDM 170, PCF 175, NRF 180, slice orchestrator 185, and flow/slice performance evaluator 190 may be implemented as VNFs within mobile network 110.

UPF 150 may act as a router and a gateway between mobile network 110 and data network 115, and forwards session data between data network 115 and RAN 135. Though only a single UPF 150 is shown in FIG. 1, mobile network 110 may include multiple UPFs 150 at various locations in network 110. SMF 155 performs session management, allocates network addresses to UEs 105, and selects and controls UPFs 150 for data transfer. AMF 160 performs authentication, authorization, and mobility management for UEs 105. NSSF 165 selects a set of network slice instances (NSIs) that may serve a UE 105, and determines the allowed single Network Slice Selection Assistance Information (S-NSSAI) for a UE 105. The UDM of UDM/UDR 170 manages data for user access authorization, user registration, and data network profiles. The UDM may operate in conjunction with the UDR which stores user data, such as customer profile information, customer authentication information, and encryption keys. PCF 175 implements policy and charging control for data flows and session related policy control.

NRF 180 operates as a centralized repository of information regarding NFs in mobile network 110. NRF 180 enables NFs (e.g., UPF 150, SMF 155, AMF 160, UDM 170) to register and discover each other via an Application Programming interface (API). NRF 180 maintains an updated repository of information about the NFs available in mobile network 110, along with information about the services provided by each of the NFs. NRF 180 further enables the NFs to obtain updated status information of other NFs in mobile network 110. NRF 180 may, for example, maintain profiles of available NF instances and their supported services, allow NF instances to discover other NF instances in mobile network 110, and allow NF instances to track the status of other NF instances.

Slice orchestrator 185 performs, among other operations and functions, network slice and NSI creation, virtual network resource allocation, instantiation, and provisioning, and network slice and NSI monitoring, reporting, and life cycle management (LCM).

Flow/Slice performance evaluator 190 obtains throughput and latency measurements from components implementing network slices 210 in mobile network 110. As described further herein, flow/slice performance evaluator 190 may receive performance measurements (e.g., throughput and latency measurements) reported by components within one or more network slices 210, such as, for example, a DU, a CU-UP 145, or a UPF 150, that implement a particular network slice 210 handling a data flow between a UE 105 and an app server 120. Flow/slice performance evaluator 190 may determine, based on the reported throughput and latency measurements, a throughput variation and a latency variation over one or more intervals of time at each of the reporting network slice components. For example, flow/slice performance evaluator 190 may receive and store a series of throughput measurements from a DU in a network slice 210 handling a particular data flow and may determine a throughput variation based on the throughput measurements. As another example, flow/slice performance evaluator 190 may receive and store a series of latency measurements from the DU in the network slice 210 and may determine a latency variation based on the latency measurements. Flow/slice performance evaluator 190 may store and accumulate sequences of throughput variations and latency variations over time for each data flow transiting a network slice to enable evaluator 190 to determine trends for the network slice's throughput variation and latency variation (i.e., at the particular reporting component/node in the network slice) and to forecast future throughput variation and latency variation for the network slice. Flow/slice performance evaluator 190 may further compare the determined trends and forecasts of throughput variation and latency variation for the network slice with performance requirements of the network slice to determine current and future network slice resources that are needed to maintain a service level in the network slice that satisfies the network slice's performance requirements and for network slice capacity planning.

Data network 115 may include one or more interconnected networks, such as local area networks (LANs), wide area networks (WANs), metropolitan area networks (MANs), Multi-Access Edge Computing networks (MECs), and/or the Internet. Data network 115 may, for example, connect with UPFs 150 of mobile network 110. Apps 130-1 through 130-z may connect to app servers 120-1 through 120-n in data network 115 and may communicate indirectly with UEs 105 via data network 115, UPF 150, and one or more CU-UPs 145.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 140 may include other NFs not shown in FIG. 1. As a further example, though mobile network 110 is depicted in FIG. 1 as a 5G network having 5G network components/functions, mobile network 110 may additionally or alternatively include a Fourth Generation (4G) or 4.5G network with corresponding network components/functions, or a hybrid Next Generation/4G network that includes certain components of both a Next Generation network (e.g., a 5G network) and a 4G network. Additionally, though only a single one of each of the NFs UPF 150, SMF 155, AMF 160, NSSF 165, UDM 170, PCF 175, and NRF 180 is shown in FIG. 1, mobile network 110 may include multiple instances of each of these NFs. For example, each network slice of multiple different network slices (as described with respect to FIG. 2 below) may include its own SMF 155, PCF 175, and UPF 150.

Figure 2:
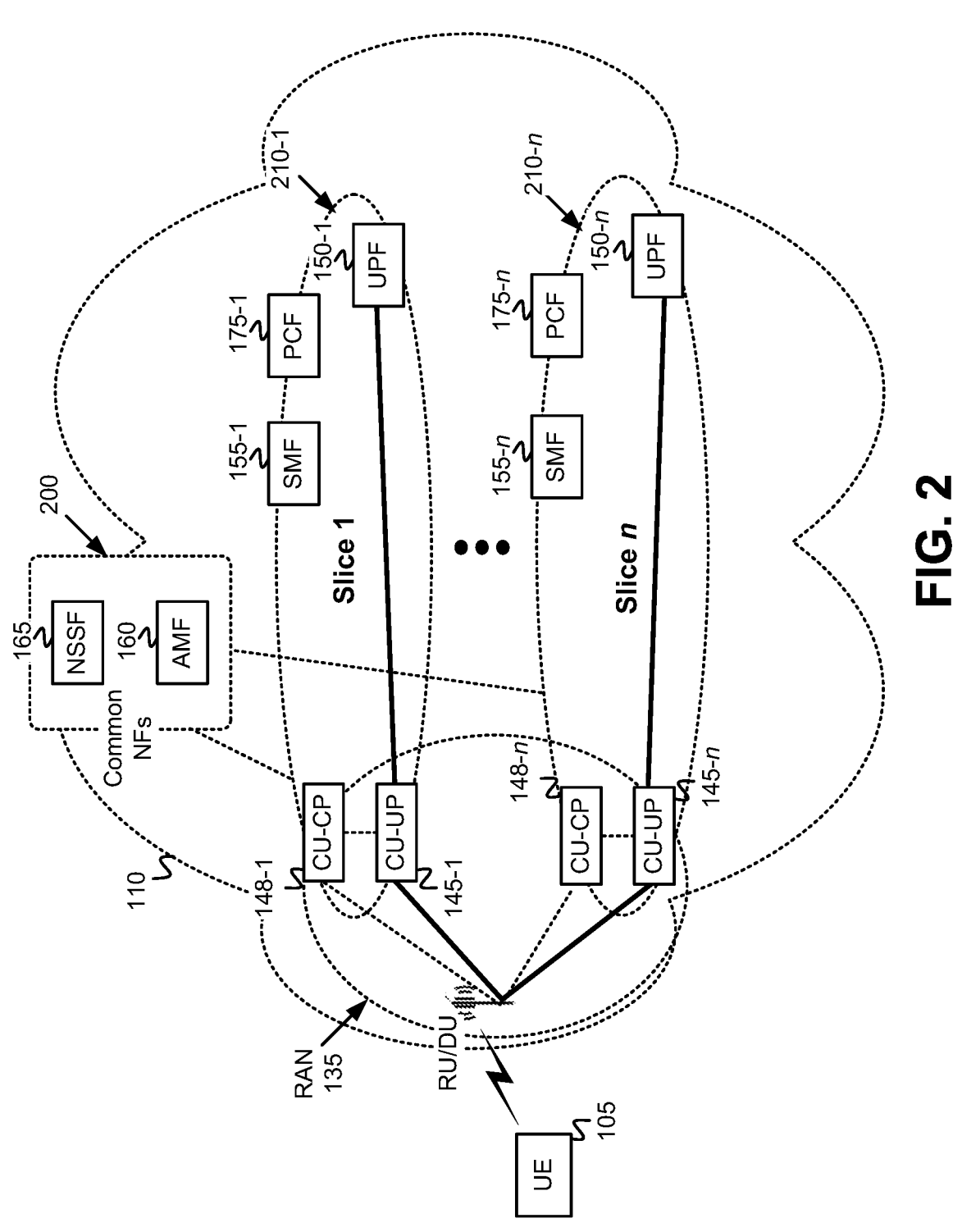
FIG. 2 depicts an example of the division of a mobile network into multiple network slices.

FIG. 2 depicts an example of the division of the mobile network 110 into multiple (n) network slices. Each network slice of network slices 210-1 through 210-n may include a logical end-to-end network, which may run on a shared physical infrastructure, that is created to serve a particular purpose and/or service data traffic with a particular set of performance parameters or characteristics. For example, each network slice of network slices 210-1 through 210-n may service a particular service type and/or may satisfy or meet particular performance requirements (e.g., performance characteristics or parameters) for sessions/flows served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (mIoT) SST. Each network slice may, however, have a different SST not described herein.

As shown in FIG. 2, a group of common NFs 200 of mobile network 110 may service the various different network slices 210-1 through 210-n (where n is greater than or equal to two) and, therefore, may not be considered to be included within the network slices 210-1 through 210-n. In the example shown, the common NFs 200 of mobile network 110 may include an AMF 160 and a NSSF 165.

Each network slice may include its own dedicated set of NFs, where each NF operates to service UE data flows/sessions handled by that particular network slice. For example, as shown in FIG. 2, network slice 210-1 includes SMF 155-1, PCF 175-1, UPF 150-1, CU-UP 145-1, and CU-CP 148-1 that may operate to exclusively service traffic of UE sessions within network slice 210-1. As a further example, network slice 210-n includes SMF 155-n, PCF 175-n, UPF 150-n, CU-UP 145-n, and CU-CP 148-n that may operate to exclusively service traffic of UE sessions within network slice 210-n. Though not shown in FIG. 2, network slice 210-1 may additionally include at least one DU and RU that may interconnect with CU-CP 148-1 and CU-UP 145-1, and network slice 210-n may additionally include at least one DU and RU that may interconnect with CU-UP 145-n and CU-CP 148-n.

Each network slice 210 may be served by one or more NSIs. An NSI, as referred to herein, includes a set of NF instances and the resources (e.g., compute, storage, and networking resources) required to form a deployed NSI for serving a particular network slice. Thus, each network slice 210 may include one or more NSIs, with each NSI serving the overall purpose and/or performance requirements of the network slice 210 within the resource constraints of the network slice 210, and each NSI may be assigned its own NSI identifier (ID). Each network slice 210 may be assigned an S-NSSAI value that uniquely identifies the network slice. The S-NSSAI value may include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAI and NSI IDs, of the different NSIs associated with the network slices, may be used within mobile network 110 for network slice and NSI selection for servicing UE sessions/flows.

Figure 3:
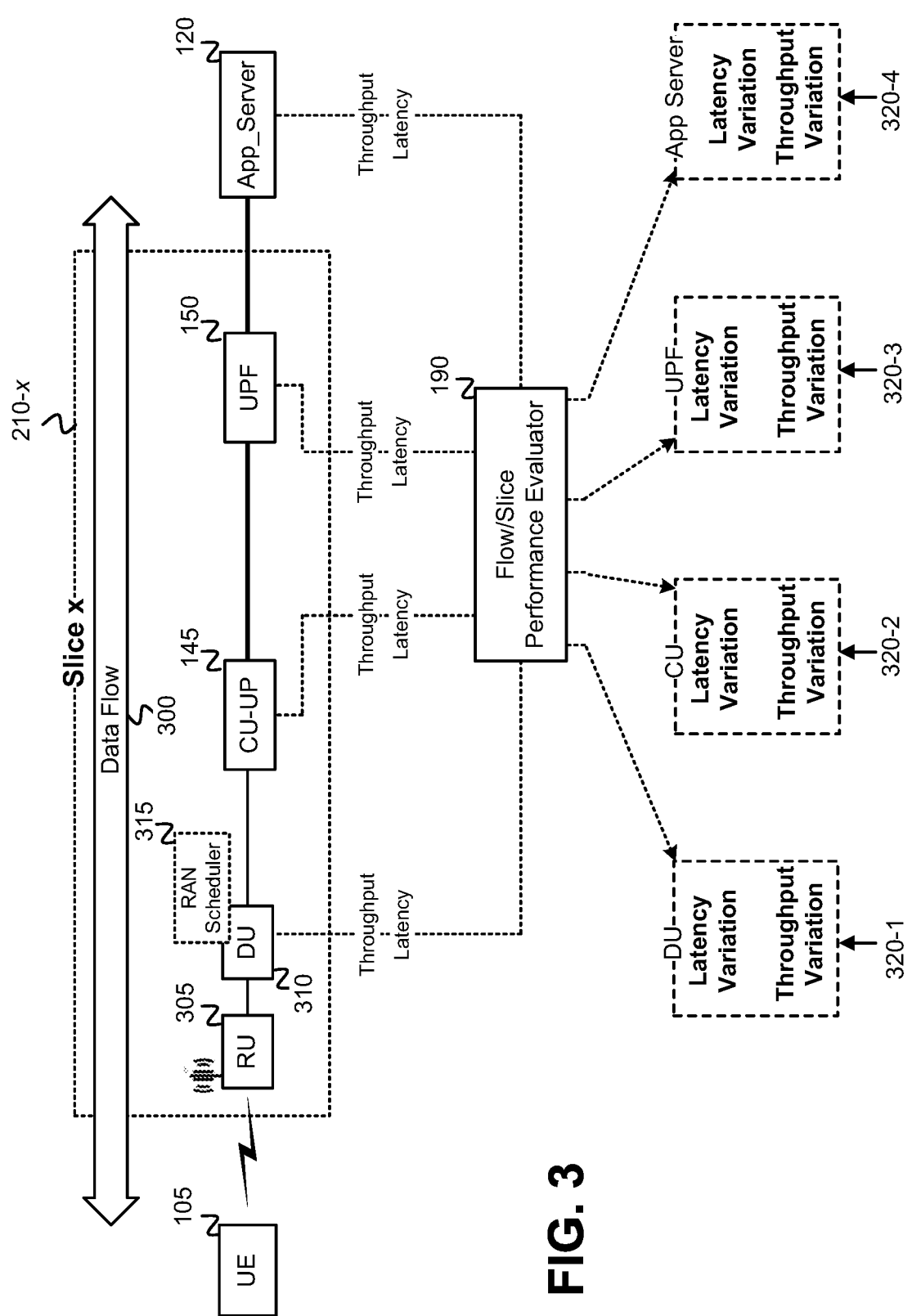
FIG. 3 illustrates an example of a flow/slice performance evaluator determining throughput variation and latency variation at network slice components handling data flows across a network slice.

FIG. 3 illustrates an example of flow/slice performance evaluator 190 determining throughput variation and latency variation at network slice components handling data flows across a network slice 210-x of multiple network slices 210, such as those depicted in FIG. 2. As shown in FIG. 3, a data flow 300 between a UE 105 and an app server 120 may, when handled by network slice 210-x, transit across the network slice components of network slice 210-x, including an RU 305, a DU 310, a CU-UP 145, and a UPF 150. A "data flow," as referred to herein includes data transmitted between a source node (e.g., UE 105) and a destination node (e.g., app server 120) for a particular session across a network slice 210-x. The data flow 300 may be transported in both directions across network slice 210-x, including from UE 105 to app server 120 and from app server 120 to UE 105. As shown, each network slice component may report a throughput measurement and a latency measurement at a particular time instance for the data flow 300. "Throughput," as referred to herein, includes a rate of data delivery (e.g., in bits per second (bps)) for a particular data flow. The rate of data delivery may be measured as incoming data of the data flow into a node of the network slice 210-x, or outgoing data of the data flow out of a node of the network slice 210-x. "Latency," as referred to herein, includes a delay in time it takes data (e.g., a data packet, cell, datagram, or other form of encapsulated data) to travel from one node to another node in network environment 100. As one example, latency of a data flow may include a delay for transit of data from UE 105 to CU-UP 145 across network slice 210-x, or from CU-UP 145 to app server 120 across network slice 210-x. The report from each network slice component may include the throughput measurement and latency measurement, and a timestamp associated with the time instance at which each measurement was made. For example, DU 310 measures a throughput and a latency, as the data flow 300 transits DU 310 at a time instance $t_1$, and sends a report to flow/slice performance evaluator 190 that includes the throughput measurement, the latency measurement, and a timestamp associated with time instance $t_1$. Similarly, CU-UP 145 and UPF 150 each measures a throughput and a latency, as the data flow 300 transits CU-UP 145 at the time instance $t_2$, and each sends a report to flow/slice performance evaluator 190 that includes the throughput measurement, the latency measurement, and a timestamp associated with the time instance $t_2$. FIG. 3 depicts a RAN scheduler 315 at DU 310, CU-UP 145, UPF 150, and app server 120 each sending reports to flow/slice performance evaluator 190 that include measured throughput and latency values for data flow 300 transiting network slice 210-*x* at DU 310.

Upon receipt of a series of throughput and/or latency measurements from a node within a network slice 210-*x*, flow/slice performance evaluator 190 may determine a throughput variation and/or latency variation based on the series of measurements. A "throughput variation," as referred to herein, may include a difference between two adjacent throughput measurements in a series of successive throughput measurements. A "latency variation," as referred to herein, may include a difference between two adjacent latency measurements in a series of successive latency measurements. FIG. 3 illustrates flow/slice performance evaluator 190 determining a latency variation value and a throughput variation value 320-1 for DU 310, a latency variation value and throughput variation value 320-2 for CU-UP 145 (e.g., at a Packet Data Convergence Protocol (PDCP) layer), a latency variation value and throughput variation value 320-3 for UPF 150 (e.g., at an Internet Protocol (IP) layer), and a latency variation value and throughput variation value 320-4 for app server 120 (e.g., at an application layer).

If flow/slice performance evaluator 190 receives a series of throughput measurements for a particular node in a network slice 210-*x*, evaluator 190 may determine a throughput variation (ThroughputVariation), having a fading timing factor, at a time j using the following relation:

$$ThroughputVariation_j = \qquad\qquad\qquad \text{Eqn. (1)}$$
$$\sum_{n=1}^{Nt-1} \lambda^n \left( Throughput_{j-n-1} - Throughput_{j-n} \right)$$

where Nt is a number of successive throughput measurements in a series of throughput measurements $\{Throughput_j, Throughput_{j-1}, Throughput_{j-2}, \ldots, Throughput_{j-Nt-1}\}$ (e.g., a most recent Nt successive measurements in a set of throughput measurements), Throughput$_j$ is a throughput measurement at time j, Throughput$_{j-1}$ is a throughput measurement at time j−1, Throughput$_{j-2}$ is a throughput measurement at time j−2, etc., and $\lambda < 1$ is a fading timing factor that applies a highest weight factor to a most recent throughput variation.

In an example in which Nt=4 and there are three previous throughput measurements, prior to time j, in addition to the most recent throughput measurement at time j, then the ThroughputVariation$_j$ would be the following:

$$ThroughputVariation_j = \lambda\left(Throughput_j - Throughput_{j-1}\right) + \qquad \text{Eqn. (2)}$$
$$\lambda^2\left(Throughput_{j-1} - Throughput_{j-2}\right) +$$
$$\lambda^3\left(Throughput_{j-2} - Throughput_{j-3}\right)$$

If the flow/slice performance evaluator 189 receives a series of latency measurements for a particular node in a network slice 210-*x*, evaluator 190 may determine a latency variation LatencyVariation at a time j using the following relation:

$$LatencyVariation_j = \sum_{n=1}^{Nl-1} \lambda^n \left( Latency_{j-n-1} - Latency_{j-n} \right) \qquad \text{Eqn. (3)}$$

where Nl is a number of successive latency measurements Latency$_j$, Latency$_{j-1}$, Latency$_{j-2}$, ..., Latency$_{j-Nl-1}$ in a series of latency measurements (e.g., a most recent Nl successive measurements from a set of latency measurements), Latency$_j$ is a latency measurement at time j, Latency$_{j-1}$ is a latency measurement at time j−1, Latency$_{j-2}$ is a latency measurement at time j−2, etc., and $\lambda < 1$ is a fading timing factor that applies a highest weight factor to a most recent latency variation.

In an example in which Nl=5 and there are four previous throughput measurements, prior to time j, in addition to the most recent throughput measurement at time j, then the LatencyVariation$_j$ would be the following:

$$LatencyVariation_j = \qquad\qquad\qquad\qquad \text{Eqn. (4)}$$
$$\lambda\left(Latency_j - Latency_{j-1}\right) + \lambda^2\left(Latency_{j-1} - Latency_{j-2}\right) +$$
$$\lambda^3\left(Latency_{j-2} - Latency_{j-3}\right) + \lambda^4\left(Latency_{j-3} - Latency_{j-4}\right)$$

FIG. 3 illustrates flow/slice performance evaluator 190 receiving throughput and latency measurements from nodes in network slice 210-*x*, and evaluator 190 determining throughput and latency variation values 320-1 through 320-4 based on the received measurements. Alternatively, one or more nodes in network slice 210-*x* may perform the throughput and/or latency measurements, determine the throughput variation and/or latency variation values, and may report the determined throughput variation and/or latency variation values to flow/slice performance evaluator 190 for collection and storage. Therefore, in this alternative, one or more nodes (e.g., RAN scheduler 315 at DU 310) may include functionality for determining the throughput and latency variation values, in addition to performing the throughput and latency measurements, and for reporting the determined throughput and/or latency variation values to evaluator 190.

In some implementations, flow/slice performance evaluator 190 may detect end-to-end break points, or other issues in the network slice 210-*x*, based on changes in throughput variation and/or latency variation at various stages along the transport path across network slice 210-*x*. For example, the occurrence of a high throughput variation value at node DU 310, and the occurrence of a very low IP throughput variation value at node UPF 150 points to a transport issue occurring within network slice 210-*x* between UPF 150 and DU 310. Evaluator 190 may, therefore, analyze the determined throughput and latency variation values 320-1 through 320-4, for nodes along the network slice 210-*x* (e.g., DU 310, CU-UP 145, UPF 150, app server 120) to identify transport issues, or other issues, associated with components along the network slice 210-*x*.

Figure 4:
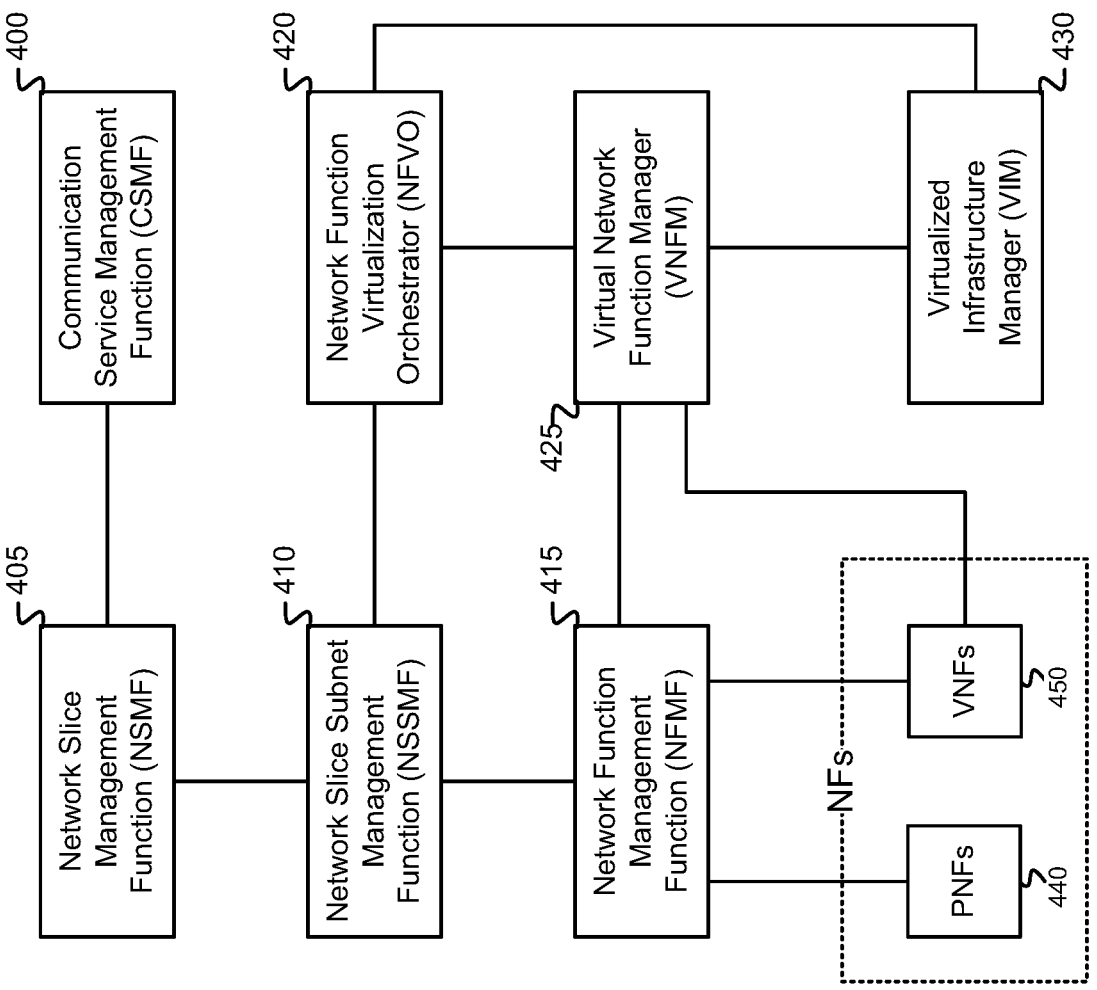
FIG. 4 illustrates exemplary components of a slice orchestrator that are related to network slice management and orchestration.
Figure 4:
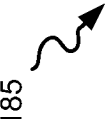

FIG. 4 illustrates exemplary components of the slice orchestrator 185 of FIG. 1 related to network slice management and orchestration. Slice orchestrator 185 may include, among other functions, a Communication Service Management Function (CSMF) 400, a Network Slice Management Function (NSMF) 405, a Network Slice Subnet Management Function (NSSMF) 410, a Network Function Management Function (NFMF) 415, a Network Function Virtualization Orchestrator (NFVO) 420, a Virtual Network Function Manager (VNFM) 425, a Virtualized Infrastructure Manager (VIM) 430, and Network Functions (NFs) 440 and 450. The functions of slice orchestrator 185 may be executed by a single network device or may be executed by multiple network devices interconnected via a network and/or one or more links.

CSMF 400 includes NFs that provision and manage communication service instances within mobile network 110. CSMF 400 requests necessary resources to implement the communication service instances and carries out service assurance and Service Level Agreement (SLA) enforcement for each service instance in active operation.

NSMF 405 includes NFs that perform NSI monitoring, reporting, and life cycle management. NSMF 405, for example, performs slice level/NSI health monitoring, SLA assurance, and slice/NSI life cycle management. NSSMF 410 performs network slice subnet instance (NSSI) monitoring, reporting, and life cycle management. NSSMF 410, for example, performs alarm correlation and statistics aggregation at the slice subnet level, and NSSI life cycle management and provisioning according to the slice profile.

NFMF 415 includes NFs that perform NF monitoring, reporting, and configuring. NFMF 415, for example, performs NF parameter configuration and provisioning. NFVO 420 includes NFs that perform resource and network service orchestration within mobile network 110. For resource orchestration, NFVO 420 oversees the allocation of resources and monitors the allocated resources. The resources may include compute resources (e.g., VNFs 450), storage resources, and network resources. The network resources may include ports, subnets, forwarding rules, etc. needed for inter-VNF communications. For network service orchestration, NFVO 420 manages VNF deployment, creates and terminates links/networks between VNFs, increases/decreases network service capacity, updates VNF forwarding information, and instantiates VNFs in coordination with VNFM 425.

VNFM 425 includes NFs that perform life cycle management of VNFs, including VNF instantiation, scaling of VNFs, updating/upgrading of VNFs, and termination of VNFs. NFVO 420 coordinates with VNFM 425 to instantiate VNFs and manage the deployment of network services that are made up of VNFs. VNFM 425 further performs key performance indicator (KPI) monitoring. VIM 430 includes NFs that control and manage the NFV infrastructure (NFVI) compute resources, storage resources, and network resources in coordination with NFVO 420 and VNFM 425. NFs 440 and 450 may include Physical NFs (PNFs) 440 and VNFs 450. PNFs 440 include physical network nodes which have not undergone virtualization. Both PNFs 440 and VNFs 450 can be used to implement an overall network service.

The configuration of the components of slice orchestrator 185 of FIG. 4 is for illustrative purposes. Other configurations may be implemented. Therefore, slice orchestrator 185 may include additional, fewer and/or different components, arranged in a different configuration, than depicted in FIG. 4.

Figure 5:
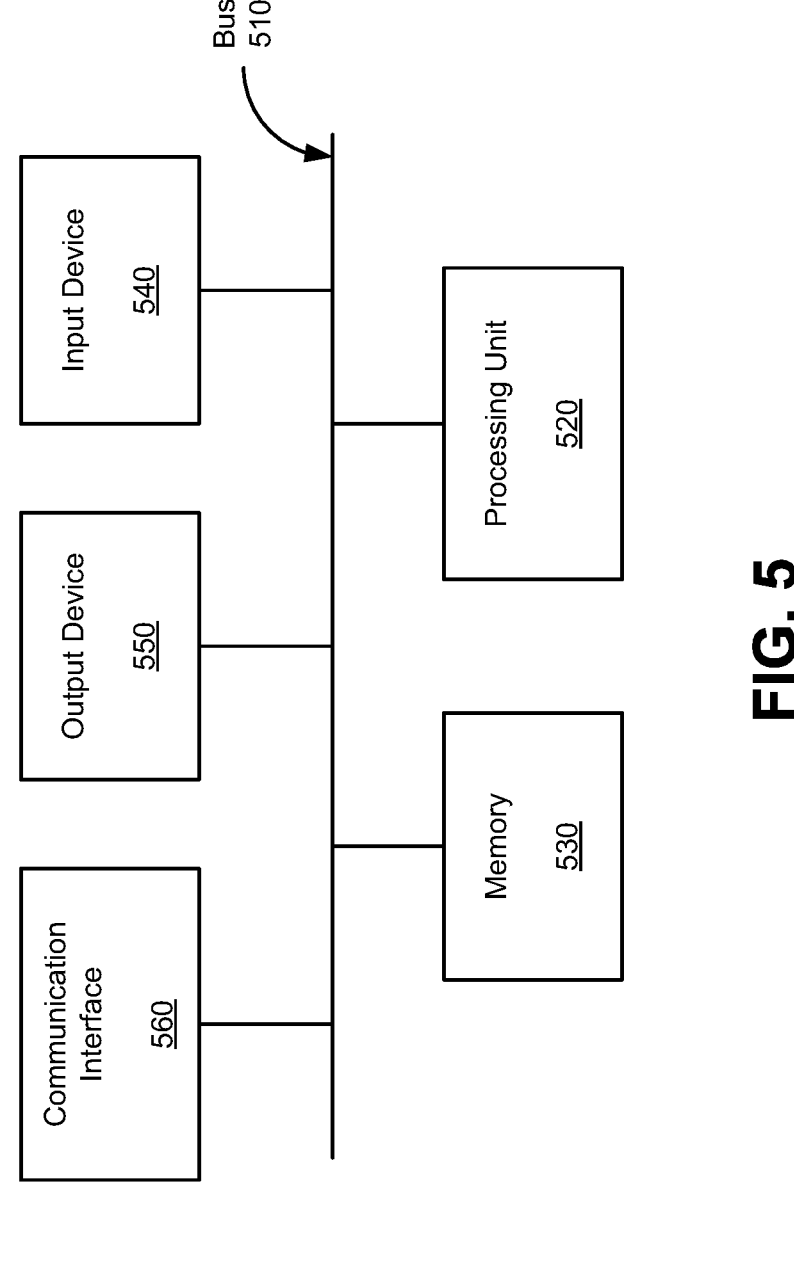
FIG. 5 is a diagram that depicts example components of a network device, as referred to herein.

FIG. 5 is a diagram that depicts example components of a network device 500 (referred to herein as a "network device" or a "device"). UEs 105, the DUs and RUs of RAN 135, slice orchestrator 185, and flow/slice performance evaluator 190 may include components that are the same as, or similar to, those of device 500 shown in FIG. 5. Furthermore, each of the network functions UPF 150, SMF 155, AMF 160, NSSF 165, UDM 170, PCF 175, and NRF 180 may be implemented by a device that includes components that are the same as, or similar to, those of network device 500. Some of the NFs UPF 150, SMF 155, AMF 160, NSSF 165, UDM 170, PCF 175, and NRF 180 may be implemented by a same device 500 within mobile network 110, while others of the functions may be implemented by one or more separate devices 500 within mobile network 110.

Device 500 may include a bus 510, a processing unit 520, a memory 530, an input device 540, an output device 550, and a communication interface 560. Bus 510 may include a path that permits communication among the components of device 500. Processing unit 520 may include one or more processors or microprocessors which may interpret and execute instructions, or processing logic. Memory 530 may include one or more memory devices for storing data and instructions. Memory 530 may include a random access memory (RAM) or another type of dynamic storage device that may store information and instructions for execution by processing unit 520, a Read Only Memory (ROM) device or another type of static storage device that may store static information and instructions for use by processing unit 520, and/or a magnetic, optical, or flash memory recording and storage medium. The memory devices of memory 530 may each be referred to herein as a "tangible non-transitory computer-readable medium," "non-transitory computer-readable medium," or "non-transitory storage medium." In some implementations, the processes/methods set forth herein can be implemented as instructions that are stored in memory 530 for execution by processing unit 520.

Input device 540 may include one or more mechanisms that permit an operator to input information into device 500, such as, for example, a keypad or a keyboard, a display with a touch sensitive panel, voice recognition and/or biometric mechanisms, etc. Output device 550 may include one or more mechanisms that output information to the operator, including a display, a speaker, etc. Input device 540 and output device 550 may, in some implementations, be implemented as a user interface (UI) that displays UI information and which receives user input via the UI. Communication interface 560 may include a transceiver(s) that enables device 500 to communicate with other devices and/or systems. For example, communication interface 560 may include one or more wired and/or wireless transceivers for communicating via mobile network 110 and/or data network 115. In the case of RUs of RAN 135, communication interface 560 may further include one or more antenna arrays for producing radio frequency (RF) cells or cell sectors.

The configuration of components of network device 500 illustrated in FIG. 5 is for illustrative purposes. Other configurations may be implemented. Therefore, network device 500 may include additional, fewer and/or different components, that may be arranged in a different configuration, than depicted in FIG. 5.

FIG. 6 is a flow diagram of an example process for determining throughput variation and/or latency variation values associated with a data flow(s) transiting a network slice(s) of mobile network 110, and using the determined throughput and/or latency variation values as a basis for network resource allocation and network slice capacity planning. The exemplary process of FIG. 6 may be implemented by flow/slice performance evaluator 190 in conjunction with slice orchestrator 185. The example process of FIG. 6 may be executed at intervals of time (e.g., a periodic interval), or upon the occurrence of one or more particular events (e.g., a known outage or failure in mobile network 110).

The exemplary process includes flow/slice performance evaluator 190 obtaining throughput and/or latency data associated with a data flow(s) transiting a network slice(s) (block 600). One or more nodes (e.g., DU 310, CU-UP 145, UPF 150) handling traffic of a data flow(s) in a network slice(s), and/or an app server 120 serving as a destination or an originator of the data flow(s), may report throughput and/or latency measurements that occur at a particular time t at the node. In one example, a node may report current throughput and/or latency measurements at periodic intervals $\{t_1, t_2, \ldots, t_n\}$. In another example, the node may report current throughput and/or latency measurements upon the occurrence of certain threshold events (e.g., throughput or latency measurements outside of threshold parameters). Flow/slice performance evaluator 190 may collect and store multiple successive throughput and/or latency measurements reported from each reporting node in the network slice(s), and may, for example, use a most recent number of measurements (e.g., Nt most recent throughput measurements or Nl most recent latency measurements from Eqns. (1) and (3) above) for determining throughput variation and/or latency variation. Evaluator 190 may receive multiple reports, with throughput and/or latency measurements, for multiple different flows in a network slice. For example, evaluator 190 may receive latency and throughput measurement reports for flow 1 in network slice 1, and latency and throughput measurement reports for flow 2 in network slice 1. Evaluator 190 may additionally receive reports, with throughput and/or latency measurements, for multiple different flows transiting multiple different network slices. For example, evaluator 190 may receive latency and throughput measurement reports for flow 1 in network slice 1, and latency and throughput measurement reports for flow 2 in network slice 2.

Flow/slice performance evaluator 190 determines a throughput variation and/or a latency variation for the data flow(s) transiting the network slice(s) (block 610). Evaluator 190 may use the relations of Eqns. (1) and (3) above to determine a current throughput variation and a current latency variation for each data flow transiting a network slice determined at a particular node along the network slice (e.g., at DU 310, CU-UP 145, UPF 150) or at an app server 120 that is a destination or originator of the data flow. Alternatively, one or more nodes (e.g., DU 310, CU-UP 145, UPF 150) within the network slice may use the throughput and latency values measured in block 600 to determine a throughput variation and latency variation using the relations of Eqns. (1) and (3). The one or more nodes may subsequently report the determined throughput variation and latency variation values, along with an associated timestamp, to flow/slice performance evaluator 190.

Flow/slice performance evaluator 190 determines trends for the throughput variation and/or latency variation for the data flow(s) transiting the network slice(s) (block 620) and forecasts future throughput variation and/or latency variation for the network slice(s) (block 630). Flow/slice performance evaluator 190 may employ machine learning techniques to determine trends for the throughput variation and/or the latency variation, including maintaining and updating a machine learning model using the collected and stored throughput variation and/or latency variation values as training data. Evaluator 190 may obtain the training data (e.g., a history of throughput variation and/or latency variation values for a particular node in a network slice) and continuously, or periodically, updates its machine learning model using existing machine learning algorithms, such as, for example, linear programming, logistic regression, decision tree, K-Nearest Neighbors (KNN), Random Forest, and/or boosted tree algorithms. Evaluator 190, using the machine learning model, may identify trends associated with the throughput variation and/or latency variation values and may forecast future throughput variation values and latency variation values for the network slice and/or for a particular node in the network slice.

Flow/slice performance evaluator 190 compares the determined trends and the forecasts of the throughput variation and/or latency variation with performance requirements of the network slice(s) (block 640). Each of the network slices, for which the trends and forecasts of throughput variation and latency variation were determined in blocks 620 and 630, has certain performance requirements, including, for example, a certain maximum throughput variation and a maximum latency variation. Evaluator 190 compares the determined trends and the forecasts of the throughput variation and/or latency variation with the maximum throughout variation and the maximum latency variation of the performance requirements of each network slice to determine whether the trends and/or forecasts indicate that the throughput variation and/or latency variation may not meet the performance requirements of the network slice(s). For example, a forecast of the throughput variation for a network slice may indicate that, at a particular future time, the throughput variation may begin to exceed the maximum throughput variation for the network slice. As another example, a forecast of the latency variation for a network slice may indicate that, at a particular future time, the latency variation may begin to exceed the maximum latency variation for the network slice.

Flow/slice performance evaluator 190 determines current and future network slice resources needed for the network slice(s) (block 650) and, based on the determination of block 650, may determine whether to add and/or remove resources to/from the network slice(s) (block 660). Based on a comparison of the determined trends and the forecasts of the throughput variation and/or latency variation in block 640 with the network slice performance requirements, flow/slice performance evaluator 190 may identify current and future network slice resources needed for maintaining the performance requirements of the network slice(s) and for network slice capacity planning. Evaluator 190 may, for example, identify particular VNFs that need to be added within a particular network slice, or may identify storage resources that need to be added for use within a particular network slice.

If adding or removing network slice resources is determined to be unwarranted (NO—block 660), then the exemplary process may return to block 600 to repeat the example process at a next iteration (e.g., upon the occurrence of a next periodic interval). If adding or removing network slice resources is determined to be warranted (YES—block 660), then flow/slice performance evaluator 190 may instruct slice orchestrator 185 to add and/or remove one or more identified network resources to/from the network slice(s) (block 670). Slice orchestrator 185, in response to the instructions from evaluator 190, may add or remove one or more identified network resources associated with implementing the particular network slice(s) that is handling the data flow(s) for which throughput and latency measurements were obtained in block 600. Adding one or more resources to a network slice may include, for example, additional storage resources, and/or additional compute resources (e.g., VNFs). Removing network resources from a network slice may include, for example, removing certain VNFs. Other network slice resources, not described herein, may be added/removed by slice orchestrator 185. CSMF 400, NSMF 405, NSSMF 410, NFMF 415, NFVO 420, VNFM 425, and VIM 430 of slice orchestrator 185 may engage in cooperative actions to provision a network slice with additional resources in mobile network 110, including performing virtual resource allocation and instantiation, and configuring newly added VNFs for the network slice.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with respect to FIG. 6, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining at least one of throughput variation or latency variation associated with at least one flow transiting a network slice of a mobile network, wherein determining the throughput variation comprises determining differences between adjacent throughput measurements in a series of multiple successive throughput measurements and using a fading timing factor to apply a highest weight factor to a most recent throughput variation that comprises a difference between most recent adjacent throughput measurements, and wherein determining the latency variation comprises determining differences between adjacent latency measurements in a series of multiple successive latency measurements and using the fading timing factor to apply the highest weight factor to a most recent latency variation that comprises a difference between most recent adjacent latency measurements;

comparing the at least one of the throughput variation or the latency variation with performance requirements of the network slice;

determining, based on the comparing, network slice resources needed for capacity planning of the network slice; and adding or removing network slice resources from the network slice based on the determined network slice resources.

2. The method of claim 1, wherein determining the at least one of the throughput variation or the latency variation further comprises:

determining trends of at least one of the throughput variation or the latency variation associated with the at least one flow transiting the network slice; and forecasting at least one of future throughput variation or future latency variation associated with the network slice.

3. The method of claim 2, wherein the comparing further comprises:

comparing the trends of the at least one of the throughput variation or the latency variation and the forecasts of the at least one of the future throughput variation or the future latency variation with the performance requirements of the network slice.

4. The method of claim 1, where the determining the network slice resources further comprises:

determining current and future network slice resources for the capacity planning of the network slice, and wherein the adding or removing the network slice resources is further based on the determined current and future network slice resources.

5. The method of claim 1, wherein determining the throughput variation (ThroughputVariation) uses the following relation:

$$ThroughputVariation_j = \sum_{n=1}^{Nt-1} \lambda^n \left( Throughput_{j-n-1} - Throughput_{j-n} \right)$$

where Nt is a number of successive throughput measurements of the series of multiple successive throughput measurements, $Throughput_j$ is a throughput measurement at a time j, and $\lambda$ is the fading timing factor that applies the highest weight factor to the most recent throughput variation.

6. The method of claim 1, wherein determining the latency variation (LatencyVariation) uses the following relation:

$$LatencyVariation_j = \sum_{n=1}^{Nl-1} \lambda^n \left( Latency_{j-n-1} - Latency_{j-n} \right)$$

where Nl is a number of successive latency measurements of the series of multiple successive latency measurements, $Latency_j$ is a latency measurement at a time j, and $\lambda$ is the fading timing factor that applies the highest weight factor to the most recent latency variation.

7. A network device, comprising:

at least one communication interface configured to communicate via a mobile network; and at least one processor configured to:

determine at least one of throughput variation or latency variation associated with at least one flow transiting a network slice of a mobile network, wherein, when determining the throughput variation, that least one processor is further configured to determine differences between adjacent throughput measurements in a series of multiple successive throughput measurements and use a fading timing factor to apply a highest weight factor to a most recent throughput variation that comprises a difference between most recent adjacent throughput measurements, and wherein, when determining the latency variation, the at least one processor is further configured to determine differences between adjacent latency measurements in a series of multiple successive latency measurements and use the fading timing factor to apply the highest weight factor to a most recent latency variation that comprises a difference between most recent adjacent latency measurements, compare the at least one of the throughput variation or the latency variation with performance requirements of the network slice, determine, based on the comparing, network slice resources needed for capacity planning of the network slice, and cause network slice resources to be added or removed from the network slice based on the determined network slice resources.

8. The network device of claim 7, wherein, when determining the at least one of the throughput variation or the latency variation, the at least one process is further configured to:

determine trends of at least one of the throughput variation or the latency variation associated with the at least one flow transiting the network slice, and forecast at least one of future throughput variation or future latency variation associated with the network slice.

9. The network device of claim 8, wherein, when comparing the at least one of the throughput variation or the latency variation with performance requirements of the network slice, the at least one processor is further configured to:

compare the trends of the at least one of the throughput variation or the latency variation and the forecasts of the at least one of the future throughput variation or the future latency variation with the performance requirements of the network slice.

10. The network device of claim 7, where, when determining the network slice resources, the at least one processor is further configured to:

determine current and future network slice resources for the capacity planning of the network slice, and wherein the adding or removing the network slice resources is further based on the determined current and future network slice resources.

11. The network device of claim 7, wherein, when determining the throughput variation (ThroughputVariation), the at least one processor uses the following relation:

$$ThroughputVariation_j = \sum_{n=1}^{Nt-1} \lambda^n \left( Throughput_{j-n-1} - Throughput_{j-n} \right)$$

where Nt is a number of successive throughput measurements of the series of multiple successive throughput measurements, $Throughput_j$ is a throughput measurement at a time j, and $\lambda$ is the fading timing factor that applies the highest weight factor to the most recent throughput variation.

12. The network device of claim 7, wherein, when determining the latency variation (LatencyVariation), the at least one processor uses the following relation:

$$LatencyVariation_j = \sum_{n=1}^{Nl-1} \lambda^n \left( Latency_{j-n-1} - Latency_{j-n} \right)$$

where Nl is a number of successive latency measurements of the series of multiple successive latency measurements, $Latency_j$ is a latency measurement at a time j, and $\lambda$ is the fading timing factor that applies the highest weight factor to the most recent latency variation.

13. A non-transitory storage medium storing instructions executable by a network device, wherein the instructions comprise instructions to cause the network device to:

determine at least one of throughput variation or latency variation associated with at least one flow transiting a network slice of a mobile network, wherein the instructions to cause the network device to determine the throughput variation further comprise instructions to cause the network device to determine differences between adjacent throughput measurements in a series of multiple successive throughput measurements and use a fading timing factor to apply a highest weight factor to a most recent throughput variation that comprises a difference between most recent adjacent throughput measurements, and wherein the instructions to cause the network device to determine the latency variation further comprise instructions to cause the network device to determine differences between adjacent latency measurements in a series of multiple successive latency measurements and use the fading timing factor to apply the highest weight factor to a most recent latency variation that comprises a difference between most recent adjacent latency measurements, compare the at least one of the throughput variation or the latency variation with performance requirements of the network slice;

determine, based on the comparing, network slice resources needed for capacity planning of the network slice; and add or remove network slice resources from the network slice based on the determined network slice resources.

14. The non-transitory storage medium of claim 13, wherein the instructions further comprise instructions to cause the network device to:

determine trends of at least one of the throughput variation or the latency variation associated with the at least one flow transiting the network slice; and forecast at least one of future throughput variation or future latency variation associated with the network slice.

15. The non-transitory storage medium of claim 14, wherein the instructions to cause the network device to compare the at least one of the throughput variation or the latency variation further comprise instructions to cause the network device to:

compare the trends of the at least one of the throughput variation or the latency variation and the forecasts of the at least one of the future throughput variation or the future latency variation with the performance requirements of the network slice.

16. The non-transitory storage medium of claim 13, where the instructions to cause the network device to determine the network slice resources further comprise instructions to cause the network device to:

determine current and future network slice resources for the capacity planning of the network slice, and wherein the adding or removing the network slice resources is further based on the determined current and future network slice resources.

17. The method of claim 1, wherein determining the throughput variation further comprises using the fading time factor to apply a lesser weighted factor to a less recent throughput variation that comprises a difference between less recent adjacent throughput measurements, and wherein determining the latency variation further comprises using the fading time factor to apply a lesser weighted factor to a less recent latency variation that comprises a difference between less recent adjacent latency measurements.

18. The network device of claim 7, wherein, when determining the throughput variation, the at least one processor is further configured to use the fading time factor to apply a lesser weighted factor to a less recent throughput variation that comprises a difference between less recent adjacent throughput measurements, and wherein, when determining the latency variation, the at least one processor is further configured to use the fading time factor to apply a lesser weighted factor to a less recent latency variation that comprises a difference between less recent adjacent latency measurements.

19. The non-transitory storage medium of claim 13, wherein the instructions to cause the network device to determine the throughput variation further comprise instructions to cause the network device to use the fading time factor to apply a lesser weighted factor to a less recent throughput variation that comprises a difference between less recent adjacent throughput measurements, and wherein the instructions to cause the network device to determine the latency variation further comprise instructions to cause the network device to use the fading time factor to apply a lesser weighted factor to a less recent latency variation that comprises a difference between less recent adjacent latency measurements.

20. The non-transitory storage medium of claim 13, wherein the instructions to cause the network device to determine the throughput variation (ThroughputVariation) further comprise instructions to cause the network device to use the following relation:

$$ThroughputVariation_j = \sum_{n=1}^{Nt-1} \lambda^n \left( Throughput_{j-n-1} - Throughput_{j-n} \right)$$

where Nt is a number of successive throughput measurements of the series of multiple successive throughput measurements, $Throughput_j$ is a throughput measurement at a time j, and $\lambda$ is the fading timing factor that applies the highest weight factor to the most recent throughput variation.

\* \* \* \* \*